July 14, 1931. T. L. SHERMAN 1,813,966
CRANKLESS ENGINE
Filed Jan. 12, 1929 2 Sheets-Sheet 1
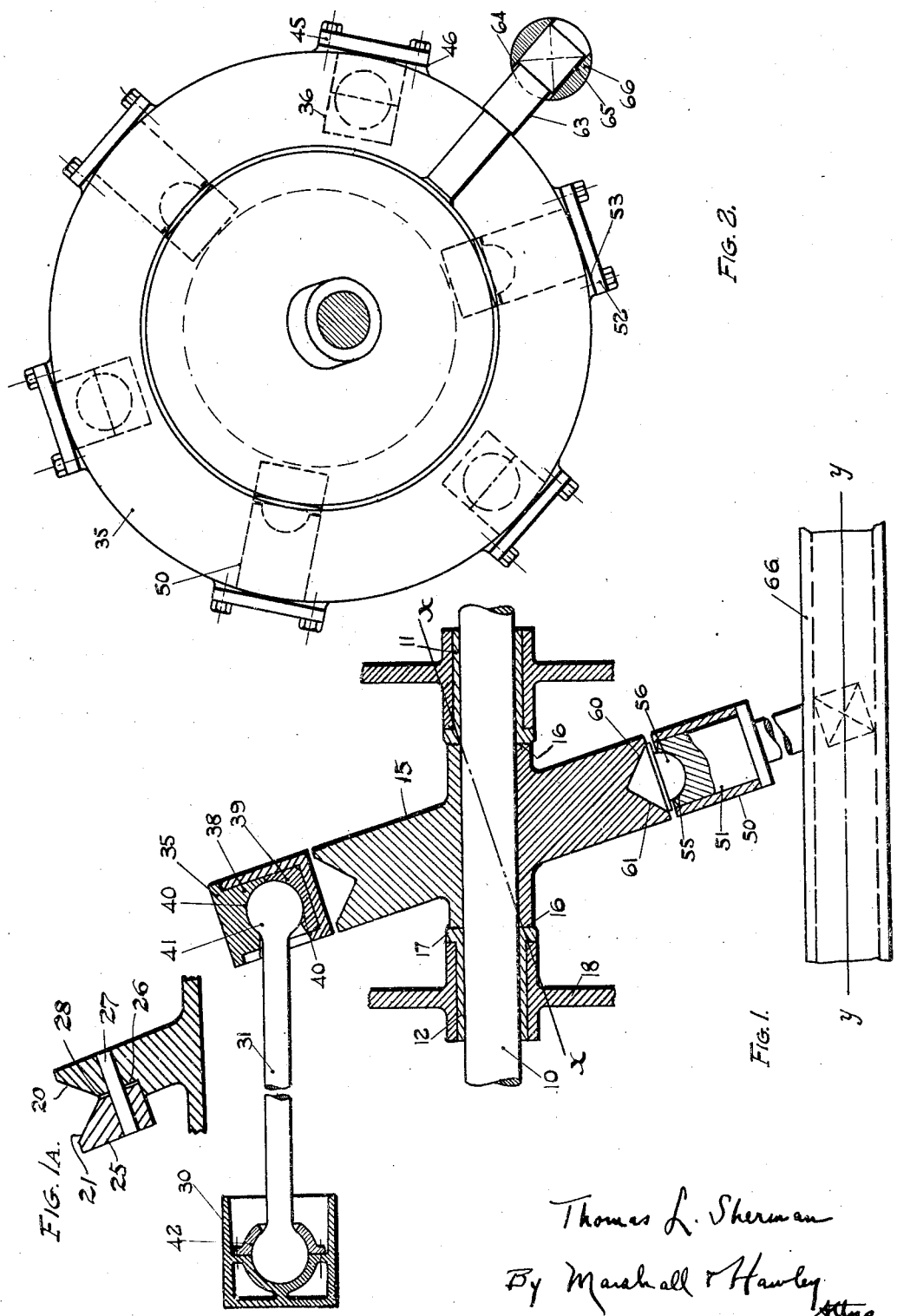

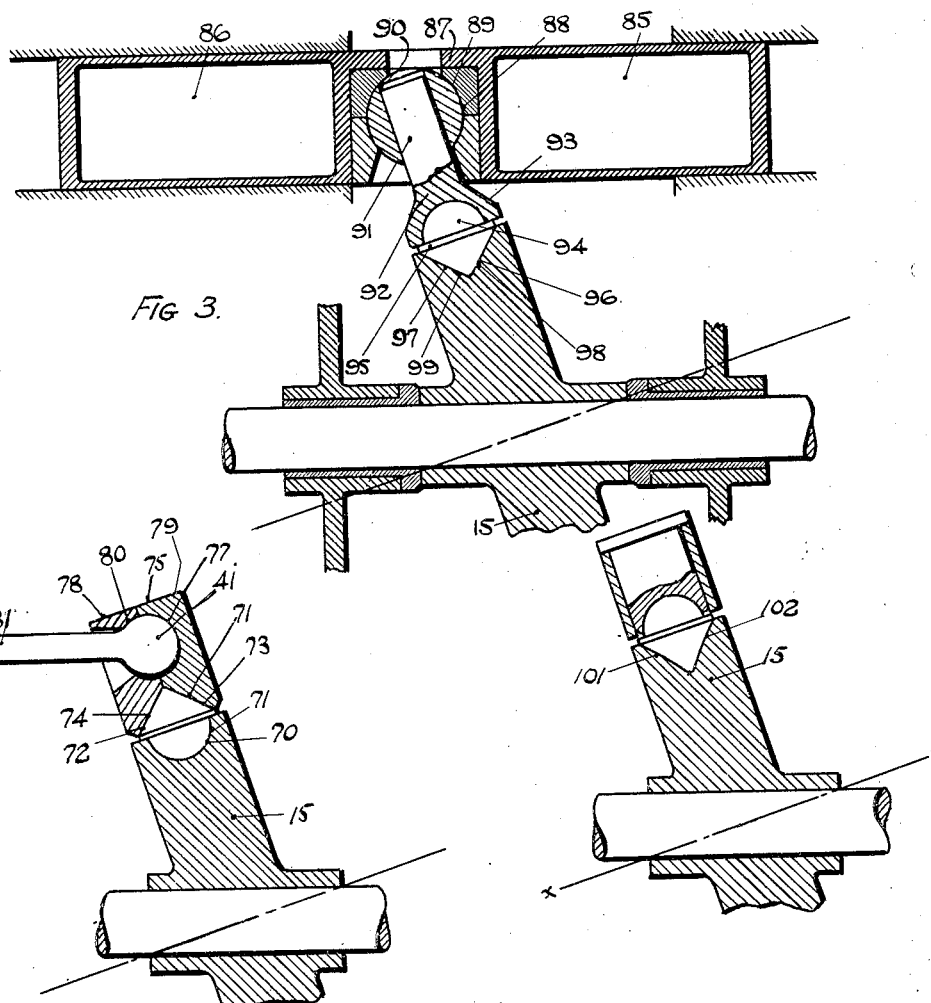

Patented July 14, 1931

1,813,966

UNITED STATES PATENT OFFICE

THOMAS LOUIS SHERMAN, OF MELBOURNE, AUSTRALIA, ASSIGNOR TO MICHELL-CRANKLESS ENGINES CORPORATION, OF NEW YORK, N. Y., A CORPORATION OF NEW YORK

CRANKLESS ENGINE

Application filed January 12, 1929. Serial No. 332,145.

This invention relates to crankless engines.

More particularly stated, the invention relates to the operative driving connections between reciprocating pistons of a crankless engine and the shaft driven thereby. A crankless engine of the type to which the invention is applicable is disclosed in Sherman Patent No. 1,555,165, granted September 29, 1925, and as shown in that patent, the pistons of the engine are operatively connected to actuate an oscillating member which in turn through suitable bearings between the oscillating member and a slant or swash plate, causes the rotation of a shaft on which the swash plate or slant is mounted.

This invention has for its salient object to provide a simpler and more efficient driving connection between the pistons or connecting rods and the swash plate or slant.

Another object of the invention is to provide a simple and practical form of bearing for operatively connecting the connecting rod and oscillating member and also a simple and practical form of bearing between the oscillating member and swash plate or slant.

Another object of the invention is to provide bearing members of the type specified, so constructed and so mounted as to be capable of ready adjustment.

Further objects of the invention will appear from the following specification taken in connection with the drawings, which form a part of this application, and in which Fig. 1 is a sectional elevation illustrating the invention applied to a swash plate;

Fig. 1A is a fragmentary sectional elevation of a portion of the swash plate showing a slightly modified form of peripheral construction.

Fig. 2 is a sectional elevation taken at right angles to Fig. 1;

Fig. 3 is a sectional elevation similar to Fig. 1 and partly broken away illustrating another embodiment of the invention;

Fig. 4 is a sectional elevation similar to Fig. 1 illustrating another form and application of the invention;

Fig. 5 is a view similar to Fig. 4 showing another slightly modified form of the invention; and Fig. 6 is a view similar to Fig. 4 illustrating another embodiment of the invention.

The invention briefly described resides in the bearing connection or driving connection between a piston actuated member, such as a yoke or connecting rod, and the slant or swash plate which is driven or rotated thereby. In one form of the invention a ring is mounted around the periphery of the slant or swash plate and slippers are positioned between the ring and the periphery of the swash plate. The ring is held against rotation but the bearing members or slippers between the swash plate are so constructed and arranged that as the ring is oscillated by the driving connection with the piston or pistons, the swash plate will be rotated, thus causing the rotation of the shaft on which the swash plate is mounted. In the particular forms of the invention illustrated, the bearing elements or slippers are provided with inclined or converging bearing surfaces and with spherical bearing surfaces adapted to coact with corresponding shaped surfaces formed respectively on the swash plate and ring.

Further details of the invention will appear from the following description.

In the form of the invention illustrated in Fig. 1, there is shown a shaft 10 journaled in bearings 11 and 12 and having formed thereon or mounted thereon a swash plate or slant 15. Endwise thrust of the shaft is prevented by thrust bearing shoulders or surfaces 16 which coact with corresponding thrust bearing surfaces 17 formed on the journal bushing 18.

The slant or swash plate 15 is provided at its periphery with inwardly converging conical bearing surfaces 20 and 21, the axes of the cones forming the conical bearing surfaces 20 and 21 coinciding with the axis X—X passing through the center of the swash plate and disposed at right angles to the plane of the swash plate.

Both of the bearing surfaces or faces 20 and 21 may be formed, if desired, integral with the disk, but Fig. 1 illustrates two possible forms of construction. The faces 20 and 21 shown at the periphery of the swash plate shown in Fig. 1 are illustrated as integral, whereas in Figure 1A, the face or surface 21 shown above the shaft 10 is illustrated as formed on a ring 25 which is secured in a recess 26 formed in the swash plate by means of bolts 27. If desired, to provide for adjustment, shims 28 may be positioned between the ring 25 and the portion of the swash plate to which the ring is bolted.

The motion of pistons 30 and connecting rods 31 is transmitted to the swash plate 15 through an oscillatable ring 35 and suitable slippers or bearings mounted between the ring and the bearing surfaces 20 and 21 formed on the periphery of the swash plate.

The ring 35, as shown in Fig. 2, has formed therein a plurality of radially disposed recesses 36 preferably cylindrical in section and extending inwardly from the outer surface of the ring. In the form of the invention illustrated in Fig. 3, there are three radial recesses 36, this ring being adapted for use in conjunction with a three cylinder engine. It will be seen that the recesses 36 are equally spaced around the axis of the ring.

Each of the recesses 36 has mounted therein a pair of bearing blocks 38 and 39 having spherical bearing surfaces 40 adapted to coact with a ball 41 formed on the end of the connecting rod 31. The connecting rod is also connected to the piston through a universal or ball and socket joint 42. The bearing blocks 38 and 39 are cylindrical in section to fit into the cylindrical radial openings 36. The blocks are held in the radial openings by clamping plates 45 and, if desired, shims 46 may be positioned between the clamping plates and the outer surface of the ring to provide for adjustment.

In order to transmit the oscillatory motion of the ring 35 to the swash plate, a plurality of slippers or bearing elements are mounted between these members. In the form of the invention illustrated in Figs. 1 and 2, the ring is shown as provided with a plurality of radially disposed cylindrical openings 50, these openings being equally spaced around the shaft and being alternated with the recesses 36.

A cylindrical bearing block 51 is mounted in each of the openings 50 and is retained in position by a plate 52 which is bolted to the outer surface of the ring. Shims 53 may be interposed between the plate and the outer ring surface to provide for adjustment.

Each bearing block 51 has a spherical surface 55 at its inner end. Slipper elements are interposed between the bearing blocks 51 and the bearing surfaces 20 and 21 formed on the periphery of the swash plate 15. Each slipper has a spherical surface 56 adapted to engage and coact with the spherical bearing surface or socket 55 formed in the block 51. Each slipper element also has converging conical bearing faces 60 and 61 formed to coact with the bearing faces 20 and 21 on the swash plate 15.

In order to prevent rotation of the ring with the swash plate or disk 15, an arm or post 63 is secured to and projects radially from the ring. The post extends through a longitudinal slot 64 and into a longitudinal opening 65 formed in a bar 66 mounted fixedly on the frame of the machine but capable of rotatable movement about the axis Y—Y.

In the embodiment of the invention illustrated in Fig. 3, the two pistons 85 and 86 are connected by a yoke 87. The yoke 87 has a spherical socket 88 within which is mounted a ball 89 having a cylindrical opening 90 therein which receives a cylindrical pin 91 carried by a ring 92. The ring 92 has a spherical socket 93 which receives a spherical bearing surface 94 formed on the slipper element 95. The slipper element 95 also has converging conical bearing surfaces 96 and 97 which coact with conical bearing faces 98 and 99 formed in the periphery of the swash plate 15.

The construction illustrated in Fig. 4 is similar to that shown in Figs. 1 and 2 but differs therefrom in that the spherical surface 70 on the slipper element coacts with a spherical socket 71 formed on the periphery of the swash plate 15 and the conical bearing surfaces 71 and 72 coact with conical bearing surfaces 73 and 74 formed at the inner periphery of the ring 75. The ring, as shown, may be formed in two sections, 77 and 78, which may be secured together in any suitable manner, as by bolts. The sections 77 and 78 are provided with spherical bearing surfaces 79 and 80 adapted to coact with the ball 41 formed on the connecting rod 31.

The same construction as that illustrated in Fig. 3 may be utilized when a single piston instead of a pair of pistons is used. In this case the unit will terminate at one side of the slant and at the end of the yoke 87, as shown by the line L—L on Fig. 3.

The mutually inclined or converging bearing surfaces or working faces of the swash plate 15 or of the ring 35 may be conical, as shown in Figs. 1 to 4, or, if desired, may be formed convex or concave. In Fig. 5 the faces 101 and 102 at the periphery of the disk or swash plate 15 are shown as convex and preferably spherical with their centers on axis X—X, and in Fig. 6 the corresponding faces 103 and 104 are concave. It will be understood that the coacting faces or surfaces on the slipper elements will be correspondingly curved or shaped.

From the foregoing description it will be clear that as the pistons or reciprocating elements are driven, the reciprocating motion thereof will cause the oscillation of the oscillating member or ring and the oscillation of this member will in turn cause the swash plate and shaft to which the swash plate is connected, to rotate. It will also be clear that the construction is simple and practical in construction and efficient in operation.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, a swash plate, a ring surrounding the periphery of said plate, a reciprocable element pivotally connected to the ring, and slipper elements operatively connecting the ring and swash plate, the connection between the slipper elements and one of said parts consisting of substantially V-shaped bearing surfaces engaging a substantially V-shaped groove, and the slipper elements having a pivotal connection with the other part engaged thereby.

2. In combination, a swash plate, a ring surrounding the periphery of said plate, a reciprocable element pivotally connected to the ring, and slipper elements mounted between and engaging said ring and swash plate, said slipper elements having converging bearing surfaces engaging one of said parts and having a pivotal connection with the other part.

3. In combination, a swash plate, a ring surrounding the periphery of said plate, a reciprocable element pivotally connected to the ring, and slipper elements mounted between and engaging said ring and swash plate, said slipper elements having conical bearing surfaces engaging one of said parts and having a pivotal connection with the other part.

4. In combination, a swash plate, a ring surrounding the periphery of said plate, a reciprocable element pivotally connected to the ring, and slipper elements mounted between and engaging said ring and swash plate, said slipper elements having conical bearing surfaces engaging one of said parts and having a pivotal connection with the other part, said conical bearing surfaces being formed in cones having their apexes located on the central axis of the swash plate.

5. In combination, a swash plate, a ring surrounding the periphery of said plate, a reciprocable element pivotally connected to the ring, and slipper elements mounted between and engaging said ring and swash plate, said slipper elements having inclined bearing surfaces disposed in bearing engagement with a peripheral substantially V-shaped groove in the swash plate and having pivotal engagement with the ring.

6. In combination, a swash plate, a reciprocable element, a ring surrounding the periphery of said swash plate, a pivotal connection between said ring and said reciprocable element, a plurality of radially disposed slipper elements mounted between and engaging said ring and said swash plate, said slipper elements having converging bearing surfaces engaging one of said parts and having a pivotal connection with the other part.

7. In combination, a swash plate, a reciprocable element, a ring surrounding the periphery of said swash plate, a pivotal connection between said ring and said reciprocable element, a plurality of radially disposed slipper elements mounted between and engaging said ring and said swash plate, one of said parts having an annular groove substantially V-shaped in section, said elements having bearing surfaces adapted to fit the walls of said groove and being pivoted with respect to the other part.

8. In combination, a swash plate, a ring surrounding the periphery of said plate, a reciprocable element pivotally connected to the ring, a plurality of radially disposed bearing blocks carried by said ring, a slipper element operatively engaging each bearing block, and interengaging bearing surfaces between said slipper elements and said swash plate.

9. In combination, a swash plate, a ring surrounding the periphery of said plate, a reciprocable element pivotally connected to the ring, a plurality of radially disposed bearing blocks carried by said ring, a slipper element pivotally engaging each bearing block, and interengaging bearing surfaces between said slipper elements and said swash plate.

10. In combination, a swash plate, a ring surrounding the periphery of said plate, a reciprocable element pivotally connected to the ring, a plurality of radially disposed bearing blocks carried by said ring, a slipper element pivotally engaging each bearing block, and interengaging converging bearing surfaces between said slipper elements and said swash plate.

11. In combination, a swash plate, a ring surrounding the periphery of said plate, a reciprocable element pivotally connected to the ring, a plurality of radially disposed bearing blocks carried by said ring, a slipper element pivotally engaging each bearing block, and interengaging conical bearing surfaces between said slipper elements and said swash plate.

12. In combination, a swash plate having a conical, peripheral bearing surface, a bearing ring connected to the peripheral portion of the swash plate and having a conical bearing surface converging with the conical bearing surface formed on the swash plate, a ring surrounding the swash plate, slipper elements having conical bearing surfaces adapted to engage and coact with the conical surfaces at the periphery of the plate, said slipper elements having pivotal connections with said second named ring.

13. In combination, a swash plate having an inclined, peripheral bearing surface, a bearing ring connected to the peripheral portion of the swash plate and having an inclined bearing surface converging with the inclined bearing surface formed on the swash plate, a ring surrounding the swash plate, slipper elements having inclined bearing surfaces adapted to engage and coact with the inclined surfaces at the periphery of the plate, said slipper elements having pivotal connections with said second named ring.

14. In combination, a swash plate, a ring surrounding the periphery of said plate, a reciprocable element pivotally connected to the ring, slipper elements operatively connecting the ring and swash plate, the connection between the slipper elements and one of said parts consisting of substantially V-shaped bearing surfaces engaging a substantially V-shaped groove, the slipper elements having a pivotal connection with the other part engaged thereby, and means for holding said ring against rotation.

15. In combination, a swash plate, a ring surrounding the periphery of said plate, a reciprocable element pivotally connected to the ring, slipper elements mounted between and engaging said ring and swash plate, said slipper elements having inclined bearing surfaces disposed in bearing engagement with a peripheral substantially V-shaped groove in the swash plate and having pivotal engagement with the ring, and means for holding said ring against rotation.

16. In combination, a swash plate, a ring surrounding said swash plate, slipper elements pivotally associated with said ring and slidably engaging the swash plate, and a reciprocatable element pivotally associated with said ring.

17. In combination, a swash plate, a ring surrounding said swash plate, and slipper elements disposed between the ring and swash plate, pivotally engaging one of said parts and slidably engaging the other of said parts.

18. In combination, a swash plate, a ring surrounding said swash plate, slipper elements pivotally associated with said ring and slidably engaging the swash plate, and a reciprocatable element operatively connected to said ring.

19. In combination, a swash plate, a ring disposed substantially in the plane of the swash plate, slipper elements disposed between the ring and swash plate, pivotally engaging one of said parts and slidably engaging the other of said parts, and a reciprocatable element operatively connected to said ring.

20. In combination, a swash plate, a ring disposed substantially in the plane of the swash plate, slipper elements pivotally associated with one of said members and slidably engaging the other of said parts, and a reciprocatable element pivotally associated with said ring.

21. In combination, a swash plate, a ring, a plurality of elements operatively connecting the ring and plate, said elements being pivotally associated with one of the connected parts and having converging bearing surfaces slidably engaging correspondingly shaped surfaces on the other part, and a reciprocatable element operatively connected to the ring.

THOMAS LOUIS SHERMAN.